US010321659B1

(12) United States Patent
Turner

(10) Patent No.: US 10,321,659 B1
(45) Date of Patent: Jun. 18, 2019

(54) SELF-CLEANING LITTER BOX

(71) Applicant: Bruce Keith Turner, Mount Pleasant, TN (US)

(72) Inventor: Bruce Keith Turner, Mount Pleasant, TN (US)

(*) Notice: Subject to any disclaimer, the term of this patent is extended or adjusted under 35 U.S.C. 154(b) by 0 days.

(21) Appl. No.: 16/269,762

(22) Filed: Feb. 7, 2019

Related U.S. Application Data

(63) Continuation-in-part of application No. 16/113,461, filed on Aug. 27, 2018, now Pat. No. 10,231,431.

(60) Provisional application No. 62/574,751, filed on Oct. 20, 2017.

(51) Int. Cl.
*A01K 1/01* (2006.01)

(52) U.S. Cl.
CPC ............ *A01K 1/011* (2013.01); *A01K 1/0114* (2013.01)

(58) Field of Classification Search
CPC .... A01K 1/0114; A01K 1/011; A01K 1/0107; A01K 1/0151
USPC ................... 119/166, 165, 163, 167
See application file for complete search history.

(56) References Cited

U.S. PATENT DOCUMENTS

| | | | | |
|---|---|---|---|---|
| 5,048,464 A | * | 9/1991 | Shirley | A01K 1/0114 119/166 |
| 5,107,797 A | * | 4/1992 | LaRoche | A01K 1/0114 119/163 |
| 5,259,340 A | | 11/1993 | Arbogast | |
| 5,267,530 A | | 12/1993 | Zamoyski | |
| 5,507,252 A | * | 4/1996 | Ebert | A01K 1/0114 119/166 |
| 5,662,066 A | * | 9/1997 | Reitz | A01K 1/0114 119/163 |
| 5,752,465 A | * | 5/1998 | Page | A01K 1/0114 119/166 |
| 7,013,835 B2 | | 3/2006 | Brokaski | |
| 8,413,608 B2 | * | 4/2013 | Sharp | A01K 1/011 119/166 |
| 8,683,952 B2 | | 4/2014 | Miller | |
| 2007/0227457 A1 | * | 10/2007 | Waters | A01K 1/0114 119/166 |
| 2008/0017123 A1 | * | 1/2008 | Chin | A01K 1/011 119/166 |
| 2011/0155070 A1 | | 6/2011 | Cook et al. | |
| 2013/0019810 A1 | * | 1/2013 | Romano | A01K 1/0114 119/167 |
| 2013/0276714 A1 | * | 10/2013 | Bauer | A01K 1/0107 119/166 |

(Continued)

*Primary Examiner* — Yvonne R Abbott-Lewis
(74) *Attorney, Agent, or Firm* — Global Intellectual Property Agency, LLC; Daniel Boudwin

(57) ABSTRACT

A self-cleaning litter box. The self-cleaning litter box includes a basin designed to rotate about an axis, having a hollow center with an interior volume designed to hold litter. An aperture is disposed in the basin designed to provide access to the interior volume. A filter screen disposed within the interior volume and extending across the basin is designed to sift excrement from the litter. The basin is disposed within a base that supports the basin. A waste container is positioned within the base. The waste container includes an opening in communication with the basin such that the aperture of the basin fits flush against the opening of the waste container when the basin is rotated for sifting excrement. In one embodiment, the self-cleaning litter box incorporates a motion sensor, a weight sensor and a wireless transceiver.

15 Claims, 4 Drawing Sheets

(56) References Cited

U.S. PATENT DOCUMENTS

2013/0333625 A1* 12/2013 Baxter ................. A01K 1/0114
119/166

* cited by examiner

SELF-CLEANING LITTER BOX

CROSS REFERENCE TO RELATED APPLICATIONS

This application claims the benefit of U.S. patent application Ser. No. 16/113,461 filed on Aug. 27, 2018, which claims the benefit of U.S. Provisional Application No. 62/574,751 filed on Oct. 20, 2017. The above identified patent applications are herein incorporated by reference in its entirety to provide continuity of disclosure.

BACKGROUND OF THE INVENTION

The present invention relates to a self-cleaning litter box. More specifically, the present invention provides a self-cleaning litter box including a rotating basin configured to hold litter therein and having an aperture along the sidewall to allow access to the interior of the basin. The basin is disposed in a base configured to support the basin. The base has a waste container with an opening therein.

Cats are one of the most popular choices for pet owners. However, most cats use a litter box which must be maintained daily. Additionally, one litter box is typically not sufficient for pet owners who own more than one cat. At most pet stores that house cats, litter boxes are cleaned several times a day. Although self-cleaning litter boxes can be purchased by cat owners, typical self-cleaning litter boxes have a tendency to scare the cat resulting in decreased usage. Therefore, there is a need for an improved self-cleaning litter box.

SUMMARY OF THE INVENTION

In view of the foregoing disadvantages inherent in the known types of litter boxes now present in the known art, the present invention provides a self-cleaning litter box wherein the same can be utilized for providing convenience for the user when cleaning the litter box by separating excrement from the litter.

The present system comprises a basin configured to rotate about an axis, having a hollow center defining an interior volume configured to hold litter. An aperture is disposed in the basin configured to provide access to the interior volume. A filter screen is disposed within the interior volume extending across the basin and configured to sift excrement from litter. The basin is disposed within a base. A waste container is disposed within the base having an opening in communication with the basin such that the aperture is configured to align with the opening when the basin is rotated. In this way, a user is able to easily sift and separate excrement from litter.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
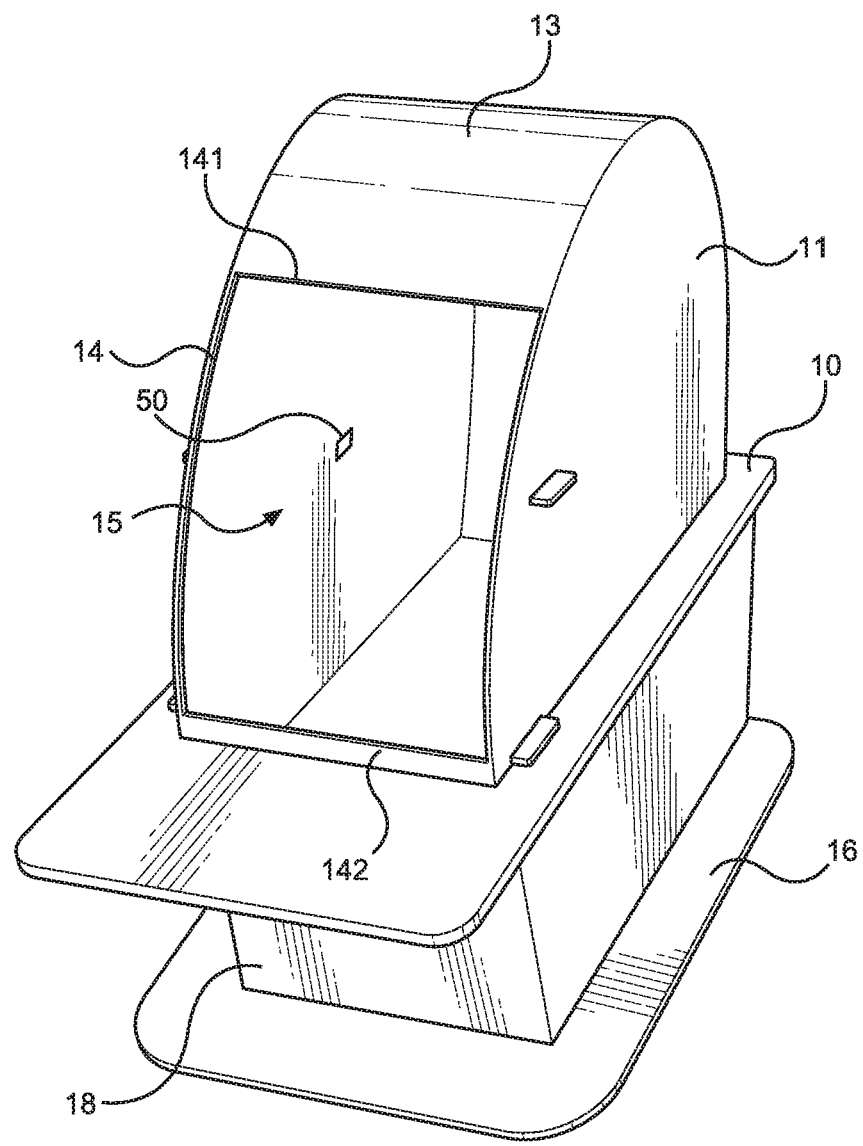
FIG. 1 shows a perspective view of an embodiment of the self-cleaning litter box.

Reference is made herein to the attached drawings. Like reference numerals are used throughout the drawings to depict like or similar elements of the self-cleaning litter box. The figures are intended for representative purposes only and should not be considered to be limiting in any respect.

Figure 2:
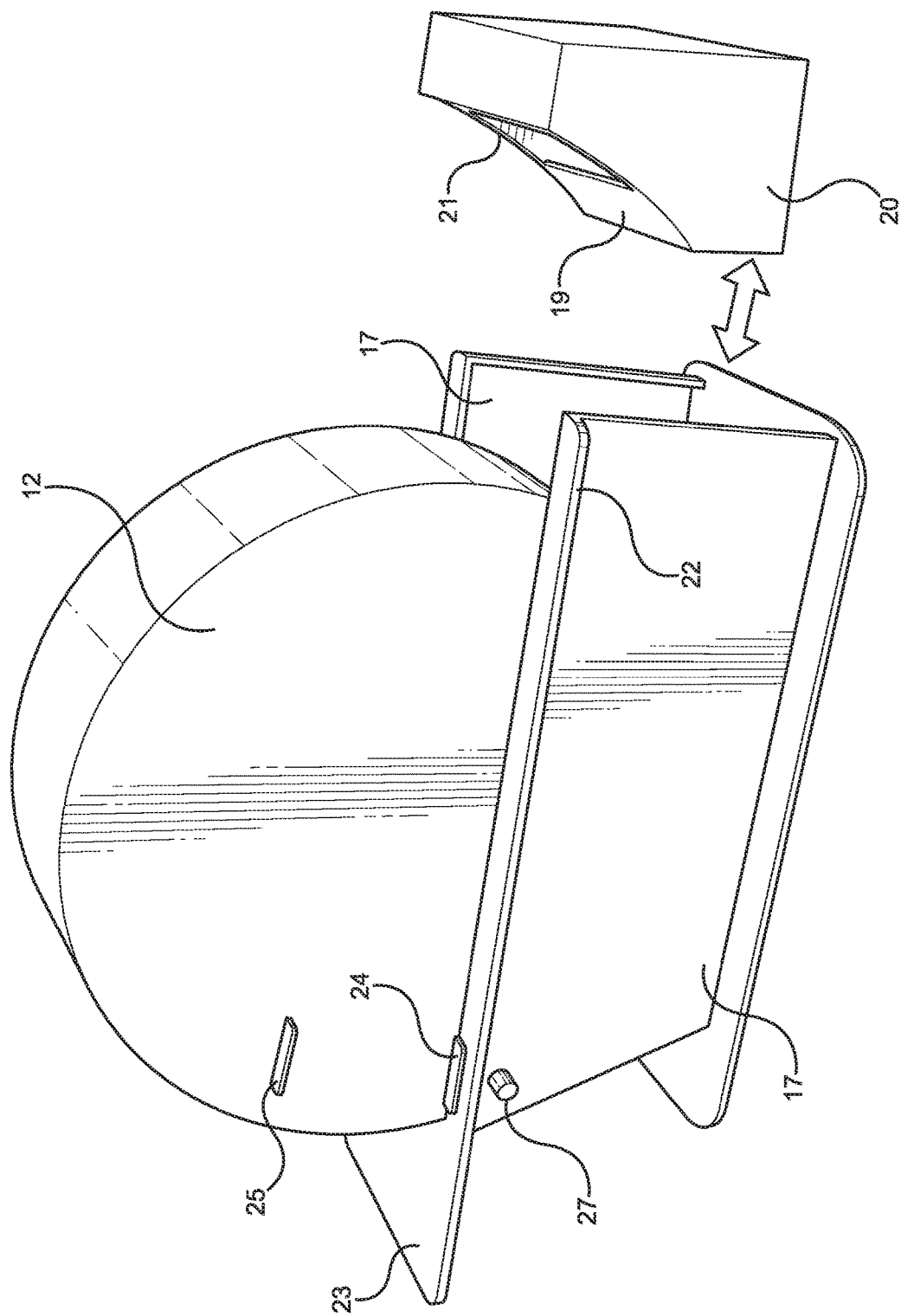
FIG. 2 shows a perspective view of an embodiment of the self-cleaning litter box with the waste container detached.

Referring now to FIG. 1 and FIG. 2, there is shown a perspective view of an embodiment of the self-cleaning litter box and a perspective view of an embodiment of the self-cleaning litter box with the waste container detached, respectively. A self-cleaning litter box 10 comprises a basin 11, configured to rotate about an axis. The basin 11 has a hollow center comprising an interior volume 15 configured to hold litter within. In the shown embodiment, the basin 11 is defined by a pair of annularly shaped sides 12 disposed opposite one another. Further, in the shown embodiment, both annularly shaped sides 12 are equivalent in diameter to one another. In the shown embodiment, the two annularly shaped sides 12 are coupled together via a circumferential sidewall 13 extending therebetween along the circumference of each annularly shaped side 12. In one embodiment, the interior volume 15 is coated with a non-stick material such that the contents of the interior volume 15 do not stick to the interior of the basin 11 when the basin 11 is rotated.

An aperture 14, having a first end 141 and a second end 142, is configured to provide access to the interior volume 15. As such, the aperture 14 is sized to allow an animal to easily pass through. In the shown embodiment, the distance between the first end 141 and the second end 142 of the aperture 14 is an arc-length of forty-five degrees of the circumferential sidewall 13. One of ordinary skill in the art will understand that the aperture 14 can be of various sizes to allow various sized animals to pass therethrough.

The basin 11 is disposed in a base 16 having a pair of sidewalls 17 as well as a front wall 18 and a back wall 19 configured to support the basin. In the shown embodiment, the basin 11 is disposed such that each annularly shaped side 12 is flush against the interior sides of the sidewalls 17 of the base 16. In the shown embodiment, the sidewalls 17 of the base 16 are configured to enclose at least half of the basin 11 in order to provide ample stability for the basin 11 when the basin 11 is rotating within the base 16. In the shown embodiment, the front wall 18 and back wall 19 are each slanted and extend outwardly from the base 16 to partially enclose the front and rear portions of the circumferential perimeter 13 of the basin 11, respectively.

A waste receptacle 20 is movably attached to the base 16 opposite the opening 21. In the shown embodiment, the waste receptacle 20 is movably attached to the rear wall 19 of the base 16. In the shown embodiment, the waste receptacle 20 is removably secured within the base 16 wherein the waste receptacle 20 makes up a portion of the rear wall 19. In the shown embodiment, the opening 21 is sized to extend across the rear wall 19 such that the opening 21 encompasses a part of the rear wall 19.

A protrusion 23 is disposed on the front wall 18 of the base 16 extending outwardly from the base 16 and basin 11. The protrusion 23 is configured to support an animal, such as a cat, thereupon, and is thus sized and strengthened appropriately to sustain the animal. The protrusion 23 is configured to align flush with the second end 142 of the aperture 14, such that the animal can enter and use the interior volume 15 of the basin 11 by utilizing the protrusion 23 to gain access to the interior volume 15.

In the shown embodiment, a flat handle 24 is disposed on an outer surface of each annular side 12, thereby allowing a user to manually rotate the basin 11 by utilizing the flat handle 24. In the shown embodiment, the flat handle 24 is disposed such that it is aligned with the second end 142 of the aperture 14. In one embodiment, a portion of the protrusion 23 extends to the sidewalls 17 of the base 16. In this way, a flange 22 is formed, wherein the flange 22 is flush against each annular side 12 of the basin 11 and extending outward from the sidewalls 17 of the base 16. In the illustrated embodiment, a pair of flat handles 24 rest atop the flange 22, such that the flange 22 is configured to prevent the basin 11 from rotating.

In one embodiment, a knob 27 is disposed on one of the sidewalls 17 of the base 16. The knob 27 extends through the sidewall 17 to act as a locking mechanism for the basin 11, wherein the user can pull the knob 27 away from the basin 11, thereby selectively unlocking the rotational ability of the basin 11. In this way, the knob 27 can prevent the basin 11 from accidentally rotating while the animal is moving within the basin 11.

In the shown embodiment, a pair of additional handles 25 are also disposed on each annular side 12 of the basin 11. In the shown embodiment, the additional handles 25 are disposed halfway up the side of the aperture 14. The additional handles 25 prevent the basin 11 from over-rotating when the handles 25 contact the flange 22, thereby preventing any litter from spilling out of the aperture 14.

Figure 3A:
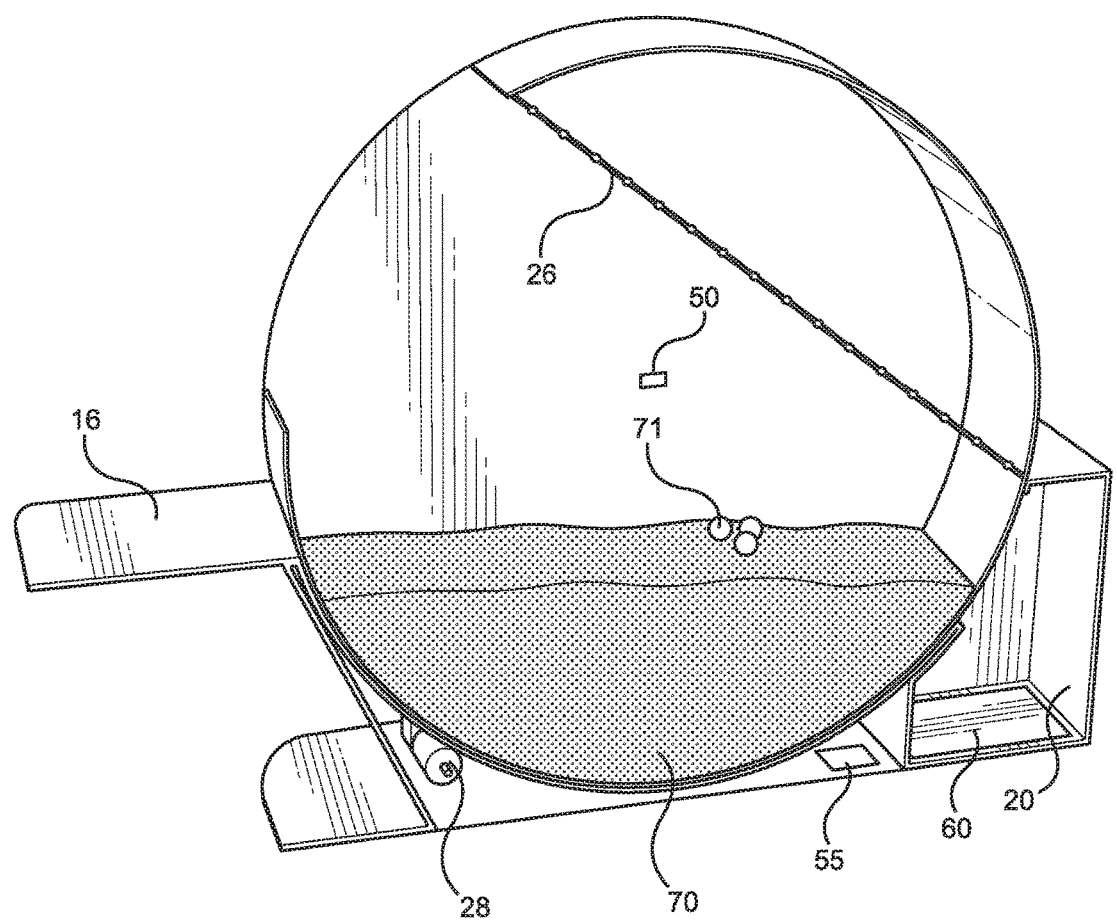
FIG. 3A shows a cross-section view of an embodiment of the self-cleaning litter box in use.
Figure 3B:
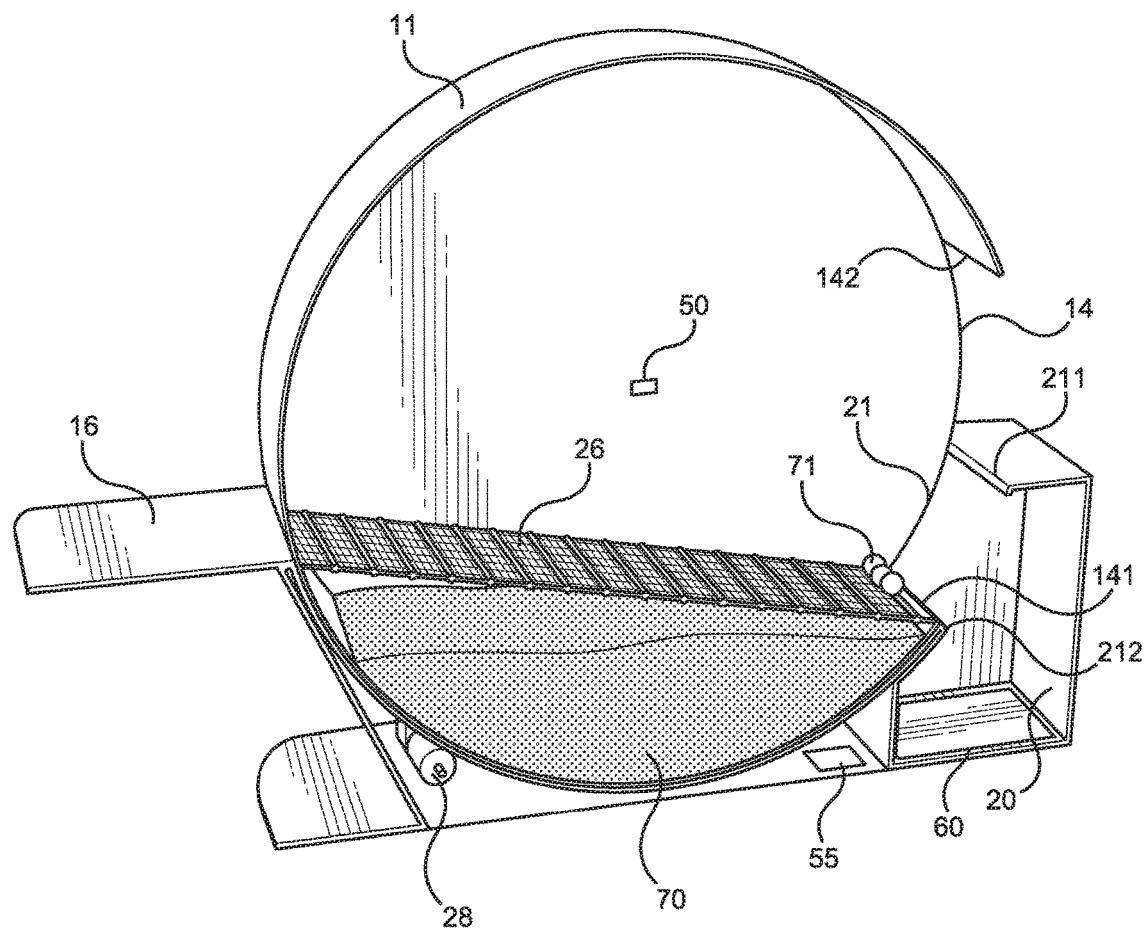
FIG. 3B shows a cross-section view of an embodiment of the self-cleaning litter box rotated and in use.

Referring now to FIGS. 3A and 3B, there are shown cross-section views of an embodiment of the self-cleaning litter box in use. A filter screen 26 is disposed within the interior volume of the basin 11. The filter screen 26 extends across a diameter of the basin 11. In the shown embodiment, the filter screen 26 is removably secured at the first end 141 of the aperture 14, such that when the basin 11 has not been rotated and the protrusion on the base 16 is aligned with the second end 142 of the aperture 14, the filter screen 26 is disposed at a top portion of the basin 11.

In use, as the basin 11 is rotated, the litter 70 and excrement 71 can slide along the interior volume of the basin 11, such that the litter 70 and excrement 71 are always at the lowest point of the basin 11 as the basin 11 rotates. The filter screen 26 is configured to sift the litter 70 as the basin 11 is rotated, such that the excrement 71 is separated from the litter 70 and retained atop the filter screen 26 with the litter 70 beneath the filter screen 26.

The opening 21 of the waste receptacle 20 has a top edge 211 and a bottom edge 212. The bottom edge 212 of the waste receptacle 20 is configured to align with the first end 141 of the aperture 14 on the basin 11 when the basin 11 is fully rotated. Once the basin 11 is rotated, the filter screen 26 is tilted such that the excrement 71 atop the filter screen 26 will slide along the filter screen 26 into the waste receptacle 20 through the opening 21. In the shown embodiment, the additional handles are configured to prevent the basin 11 from over-rotating and spilling the litter 70 out of the aperture 14. Consequently, the distance between the additional handles and the first end 141 of the aperture 14 is configured to be equivalent to a length of the opening 21 of the waste receptacle 20, such that the additional handles are always aligned with the top edge 211 of the waste receptacle 20 and the first end 141 of the aperture 14 is always aligned with the bottom edge 212 of the waste receptacle 20, when the basin 11 is fully rotated.

In one embodiment, a motor 28 is disposed within the base 16. The motor 28 is operably connected to the basin 11 and configured to rotate the basin 11. In a further embodiment the motor 28 is operably connected to a processor 55. In a further embodiment still, a motion sensor 50 can be disposed on an interior side of the basin, configured to detect movement in the interior volume of the basin 11. In such an embodiment the motion sensor 50 can be operably connected to the processor 55. In one embodiment the motion sensor 50 can be disposed on the center of an interior side of the basin 11. In one embodiment the processor 55 incorporates a wireless transceiver which can wirelessly communicate with the motion sensor 50 and the motor 28.

Where the motion sensor 50 detects movement, the motion sensor 50 can communicate with the processor 55. The processor 55 can wait a predetermined amount of time and where the predetermined amount of time has passed without a further communication from the motion sensor 50, the processor 55 can activate the motor 28, thereby causing the basin 11 to rotate and filter the excrement 71 from the litter 70. Where a communication from the motion sensor 50 occurs prior to the predetermined amount of time, the timer can be reset, and a new waiting period commence.

The processor 55 can further be configured to fully rotate the basin 11, and after a full rotation, reverse the rotation of the basin 11 to restore the basin 11 to a configuration ready to receive an animal. In one embodiment, the motor 28 can be configured to rotate the basin 11 at varying speeds. The processor 55 can also be configured to halt, or reverse activation of the motor 28, and therefore rotation of the basin 11, where the motion sensor 50 communicates that motion has been detected inside the interior volume. In one embodiment brakes are disposed on the motor 28, in operable communication with the processor 55. In such a manner, the basin 11 can be configured to be rotated and if an animal were still present in the basin when rotation was occurring, the motion sensor 50 can detect the animal moving and stop rotation of the basin via the processor 55. In this manner, a user can rely on the self-cleaning litter box to separate the excrement 71 from the litter 70 when the user is not around to manually rotate and the basin 11.

In one embodiment a weight sensor 60 is disposed in the waste container 20, configured to measure the weight of matter deposited in the waste container 20. In one embodiment, the weight sensor 60 is disposed on a floor of the waste container 20. In another embodiment, the weight sensor 60 is operably connected to the processor 55 and a non-transitory computer readable medium. The weight sensor 60 can be configured to communicate the weight of matter deposited in the waste container at a given time with the processor 55 and such value stored in the non-transitory computer readable medium.

In operation, the basin 11 is placed in the base 16 in a configuration where the filter screen 26 is at a top portion of the basin 11, such that the filter screen 26 is out of the way of an animal in the interior volume. In such a configuration, the lower end of the aperture 14 is aligned with the protrusion of the base 16. Litter 70 is disposed in the bottom of the basin 11. After an animal has used the litter 70 disposed within the basin 11, a user can rotate the basin 11 such that the filter screen 26 separates the excrement 71 from the litter 70. As the basin 11 is rotated, the excrement 71 atop the filter screen 26 can slide into a waste container 20 located at the back end of the base 16. In another embodiment, the basin 11 can automatically rotate via a motor 28 operably connected to the basin 11.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A self-cleaning litter box, comprising:
   a basin configured to rotate about an axis, the basin having a hollow center defining an interior volume;
   an aperture disposed in the basin;
   the aperture dimensioned to provide access to the interior volume;
   a filter screen disposed within the interior volume;
   the filter screen extending across a diameter of the basin;
   a base configured to support the basin such that the basin rests flush in the base;
   a waste container movably attached to the base opposite the aperture;
   the waste container defining an opening in communication with the basin, such that the aperture is configured to fit flush against the opening when the basin is rotated;
   a motor operably connected to the basin and configured to rotate the basin;
   a processor in operable connection with the motor;
   the processor configured to activate the motor when actuated.

2. The self-cleaning litter box of claim 1, wherein the waste container is removable from the base.

3. The self-cleaning litter box of claim 1, wherein a first edge of the filter screen is disposed at one end of the aperture.

4. The self-cleaning litter box of claim 1, wherein a protrusion is disposed on the base extending outwardly from the basin at a height consistent with a lower end of the aperture and configured to support an animal thereupon.

5. The self-cleaning litter box of claim 1, wherein a flat handle protruding outward is disposed on each annular side of the basin.

6. The self-cleaning litter box of claim 5, wherein an additional handle protruding outward is disposed on each annular side of the basin, wherein the additional handle is configured to prevent rotation of the basin when the additional handle contacts a flange defined by a portion of the protrusion that extends to the sidewalls of the base.

7. The self-cleaning litter box of claim 1, wherein a motor that is operably connected to the basin is disposed in the base and configured to rotate the basin.

8. The self-cleaning litter box of claim 1, wherein a motion sensor is disposed on an interior side of the basin and is in operable connection with the processor, the motion sensor configured to detect movement in the interior volume of the basin and to actuate the motor after movement is no longer detected for a predetermined amount of time.

9. The self-cleaning litter box of claim 8, wherein the motion sensor is disposed on the center of the interior side of the basin.

10. The self-cleaning litter box of claim 1, wherein a weight sensor is disposed in the waste container, operably connected to the processor.

11. The self-cleaning litter box of claim 10, wherein the weight sensor is disposed on a floor of the waste container.

12. The self-cleaning litter box of claim 1, wherein the processor can be configured to fully rotate the basin, and after a full rotation, reverse the rotation of the basin to restore the basin to an original configuration.

13. The self-cleaning litter box of claim 1, wherein the motor can be configured to operate at varying speeds.

14. The self-cleaning litter box of claim 1, wherein the motor further comprises a brake.

15. The self-cleaning litter box of claim 1, wherein the motor can be configured to reverse the direction of rotation of the basin.

* * * * *